(12) United States Patent
Henderson et al.

(10) Patent No.: US 7,273,143 B2
(45) Date of Patent: Sep. 25, 2007

(54) POWERED ROTARY BOARD TURNER

(75) Inventors: Deane R. Henderson, Salmon Arm (CA); Geoff Wight, Salmon Arm (CA)

(73) Assignee: Coe Newnes/McGehee Inc., Salmon Arm (CA)

( * ) Notice: Subject to any disclaimer, the term of this patent is extended or adjusted under 35 U.S.C. 154(b) by 0 days.

(21) Appl. No.: 11/478,080

(22) Filed: Jun. 30, 2006

(65) Prior Publication Data

US 2007/0158164 A1 Jul. 12, 2007

Related U.S. Application Data

(63) Continuation-in-part of application No. 10/808,314, filed on Mar. 25, 2004, now abandoned.

(60) Provisional application No. 60/461,386, filed on Apr. 10, 2003.

(51) Int. Cl.
*B65G 47/24* (2006.01)

(52) U.S. Cl. ..................... 198/403; 198/413

(58) Field of Classification Search ............... 198/394, 198/402, 403, 411, 412, 413, 414
See application file for complete search history.

(56) References Cited

U.S. PATENT DOCUMENTS

| | | | | |
|---|---|---|---|---|
| 4,119,216 A | * | 10/1978 | Pryor et al. | 198/413 |
| 4,484,675 A | * | 11/1984 | Doherty et al. | 198/413 |
| 5,412,220 A | * | 5/1995 | Moore | 198/403 |
| 5,482,140 A | * | 1/1996 | Moore | 198/403 |
| 5,685,410 A | * | 11/1997 | Ritola et al. | 198/457.06 |
| 6,446,785 B1 | * | 9/2002 | Tremblay | 198/411 |
| 6,769,529 B2 | * | 8/2004 | Fournier et al. | 198/403 |

* cited by examiner

*Primary Examiner*—James R. Bidwell
(74) *Attorney, Agent, or Firm*—Antony C. Edwards

(57) ABSTRACT

A method and apparatus of turning a board while the board is being transferred in a conveyance system includes a conveyance system for transporting a board, a rotary turning device for rotating the board, a bumper stop for restraining the board and a speed-up belt for increasing or decreasing delivery of the board. The rotary turning device rotates at a constant rate relative to the conveyance system speed; the bumper stop stops the flow of the lumber allowing the rotary turning device to pick up the board; the speed-up belt accelerates the board to the front of the lug space and the conveyance system transports the board while it is turned within the lug space.

21 Claims, 16 Drawing Sheets

STEP #5

BOARD STOP DROPS DOWN TO AVOID THE FOLLOWING BOARD

STEP #6 Fig 18

BOARD NOT REQUIRING TURNING PASSES OVER TURNING ARM

VARIATION — 3 ARM TURNER

POWERED ROTARY BOARD TURNER

CROSS REFERENCE TO RELATED APPLICATION

This application is a Continuation-in-Part of U.S. application Ser. No. 10/808,314 filed Mar. 25, 2004 now abandoned which claims priority from U.S. Provisional Patent Application No. 60/461,386 filed Apr. 10, 2003 entitled Powered Rotary Board Turner.

FIELD OF THE INVENTION

The present invention relates generally to a board turner and more specifically it relates to a method and apparatus for the powered rotary turning of a board while the board is being conveyed.

BACKGROUND OF THE INVENTION

Rotary board turners in the prior art do not incorporate a physical stop and are not necessarily driven. Conventional board turners do not provide for controlling the speed of the conveyor while rotating the board. Conventional board turners may also fail to turn boards in a conveyance system as the conveyance system is started and stopped.

Prior art board turners are not as suitable for controlling the speed of the conveyor and rotating the board while the board is being transferred in a conveyance system as is the board turner according to the present invention. The main problem with conventional board turners is the inability to control the speed of the conveyance system while reliably rotating the board. Another problem in the prior art is the inability to select individual boards to be turned as the conveyance system speed is changed. Another problem with existing turners is the need to change timing with various thickness, width and wane conditions of the boards.

In these respects, the powered rotary board turner according to the present invention substantially departs from the conventional concepts and designs of the prior art, and in so doing provides an apparatus primarily developed for the purpose of maintaining reliable board turning as conveyance system speed increases or decreases over a wide range of speeds and as product sizes vary.

SUMMARY OF THE INVENTION

In view of the foregoing disadvantages inherent in the known types of board turners now present in the prior art, the present invention provides a new powered rotary board turner construction which comprises a variable speed or fixed speed conveyance system for transporting the boards, a rotary turning device for rotating a board, a bumper stop for restraining the board and a speed up belt for increasing or decreasing delivery of the board. The rotary turning device rotates at a rate relative to the lug or conveyance speed; the bumper stop stops the flow of the lumber allowing the rotary turning device to pick up the board; the speed-up belt or some other acceleration means accelerates the board to the front of the lug space or bumper as the conveyance system transports the board.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description, and should not be regarded as limiting.

The method and apparatus of turning a board according to the present invention while the board is being transferred in a conveyance system, wherein the speed of the board is controlled by the powered rotary board turner, includes a powered rotary board turner which accelerates the board to the front of the conveyance system, and wherein the board is stopped by a retractable or fixed bumper stops which are proud of the top of the conveyance system, and wherein the powered rotary board turner picks up the board and rotates it over the bumper stop and gravity feeds it to the same conveyor and lug space it originates from, and wherein the powered rotary board turner rotates at a rate which is constant relative to the conveyance system speed, and which speeds up or down as the conveyance system speed increases or decreases.

In summary, the rotary board turner may be characterized according to one aspect of the present invention as including a conveyor, an acceleration means, a bumper stop and a driven rotator arm.

The conveyor has discreet board engaging means such as lugs in spaced relation therealong defining board carrying spaces therebetween for carrying, at a downstream translation velocity along a flow path, a board aligned across a downstream flow direction of the conveyor. The acceleration means, such as a speed-up belt, is for accelerating, relative to the conveyor and the conveyor velocity, the board in a board carrying spaces to a downstream-most end of the board carrying space. The bumper stop is positioned in or positionable into a board engaging position in the flow path so as to engage the board in the board carrying space when at the downstream-most end and so as to inhibit motion of the board in the downstream flow direction while the board is in contact with the conveyor and while the conveyor is simultaneously in motion at the translation velocity. The acceleration means may have an upstream end and an opposite downstream end, and the bumper stop may be adjacent the downstream end of the acceleration means.

At least one driven rotator arm is rotatably mounted under the conveyor for rotating to engage an underside of the board. Once the board is engaged against the bumper stop, the rotator arm rotates the board one hundred eighty degrees about its longitudinal axis, and up and over the bumper stop in the down-stream flow direction, so as to deposit the board towards an upstream end of the board carrying space without requiring a change in or stopping of the translation velocity of the conveyor. The driven rotator arms may include a pair of oppositely disposed rigid arms rigidly cantilevered from a driven shaft. The driven shaft may be driven at a rotational speed which is constant relative to the translation velocity of the conveyor. The driven shaft and the conveyor may be mechanically linked to one another by a driving linkage means so as to provide the rotational speed which is constant relative to the translation velocity of the conveyor.

In one embodiment the bumper stop is mounted to an actuator for selectively actuable substantially vertical translation between an elevated position corresponding to the board engaging position and a lowered position removed from the flow path.

The bumper stop may be actuable independently of rotation of the driven rotator arms.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIGS. 4, 5, 6, 7, 8, 9a, 9b, 9c and 10 illustrate the device of FIG. 2 and the process of turning a board in 3 inch travel increments wherein:

FIG. 4 is a view of a board approaching the device from upstream.

FIG. 5 is a view of the board upstream from the conveyance system and the belt thereby slipping under the board.

FIG. 6 is a view of the board resting against the bumper stop.

FIG. 7 is a view of the board at rest against bumper stop just prior to the turner engaging board.

FIG. 8 is a view of the board being raised off of the belt by the rotary board turner.

FIG. 9 (a) is a view of the board being rotated around the bumper stop before reaching the vertical.

FIG. 9 (b) is a view of the board being rotated around the bumper stop almost at the vertical.

FIG. 9 (c) is a view of the board being rotated around the bumper stop just past the vertical.

FIG. 10 is a view of the board falling from the position of FIG. 9c so as to be gravity fed away from the rotary board turner.

FIG. 11 (b) is a view of the board being further sped away from the turner by the speed up belt.

DETAILED DESCRIPTION OF EMBODIMENTS OF THE INVENTION

Figure 1:
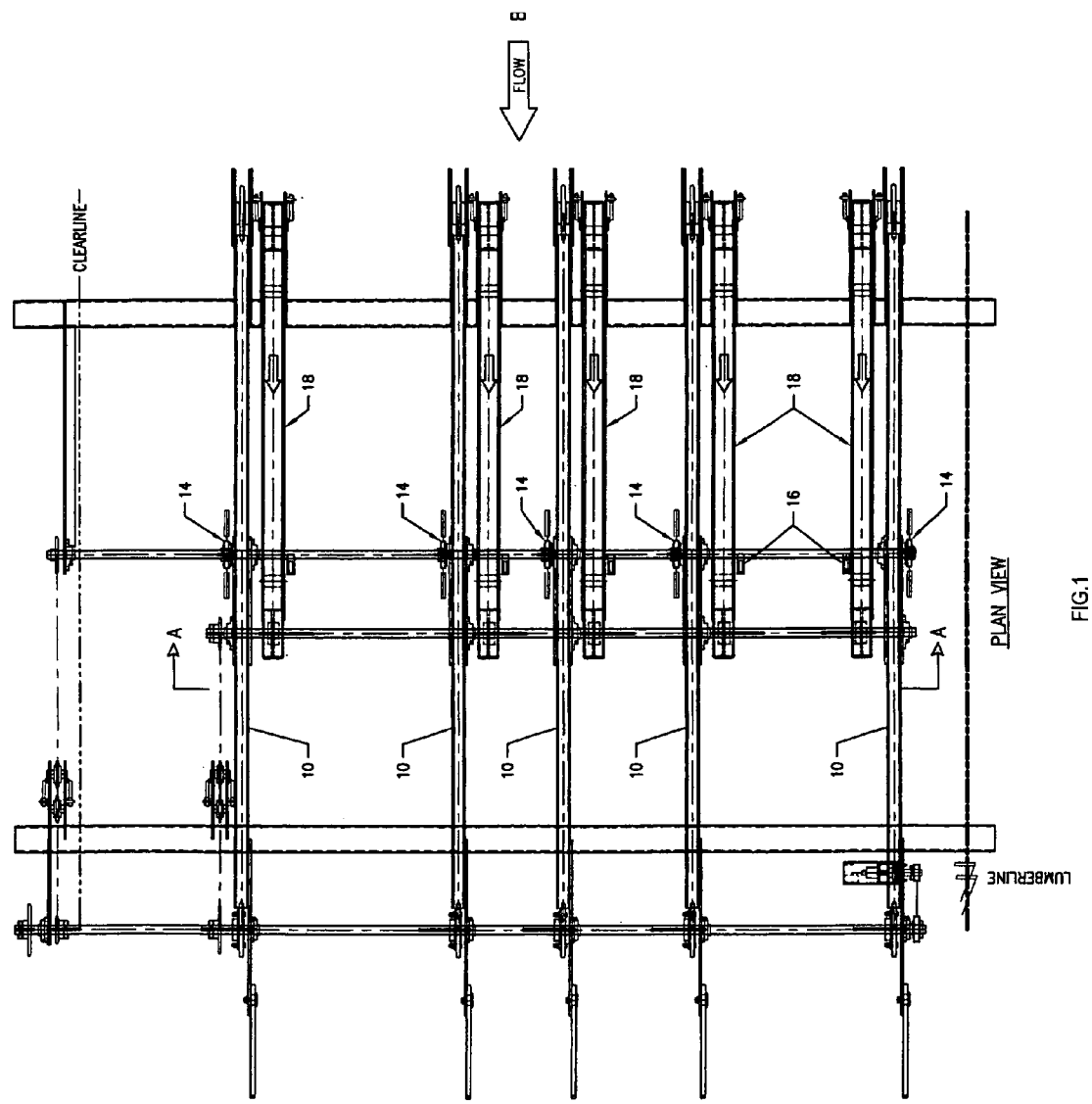
FIG. 1 is a planar view of one embodiment of the board turner according to the present invention.
Figure 2:
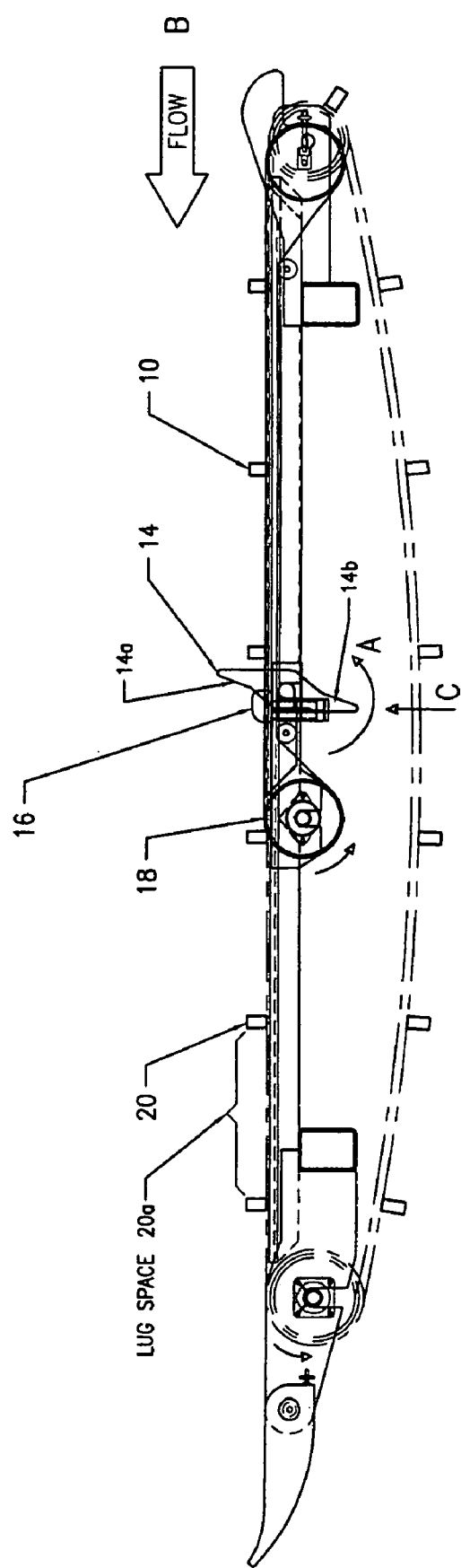
FIG. 2 is a side elevation view of the embodiment of FIG. 1.
Figure 3:
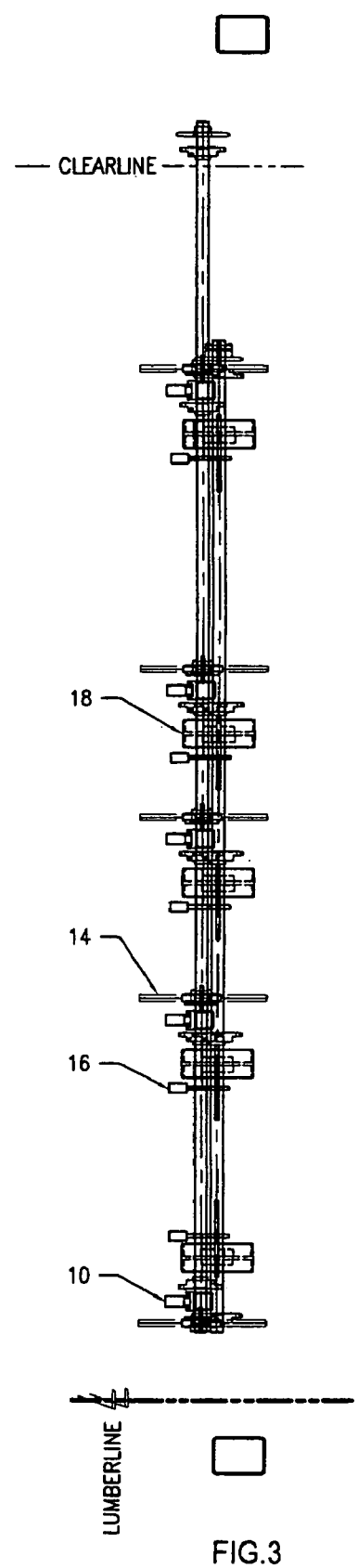
FIG. 3 is a horizontal view from the end of the conveyance system.
Figure 4:
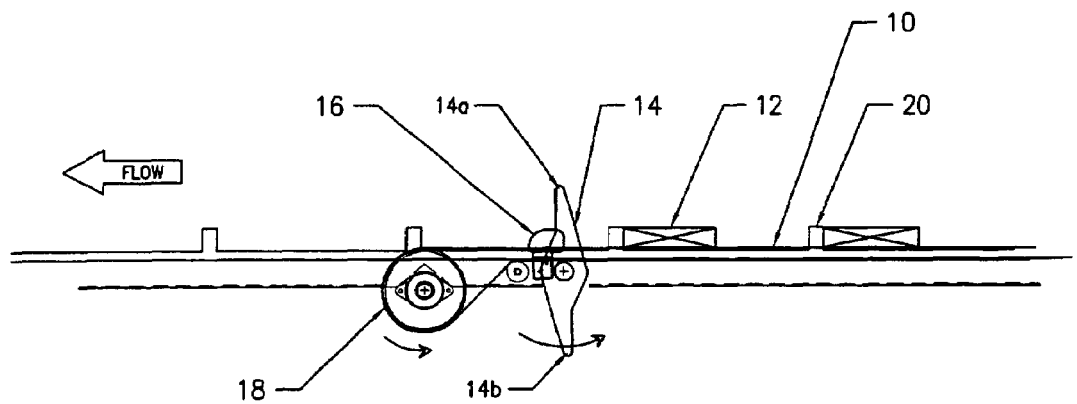
Figure 5:
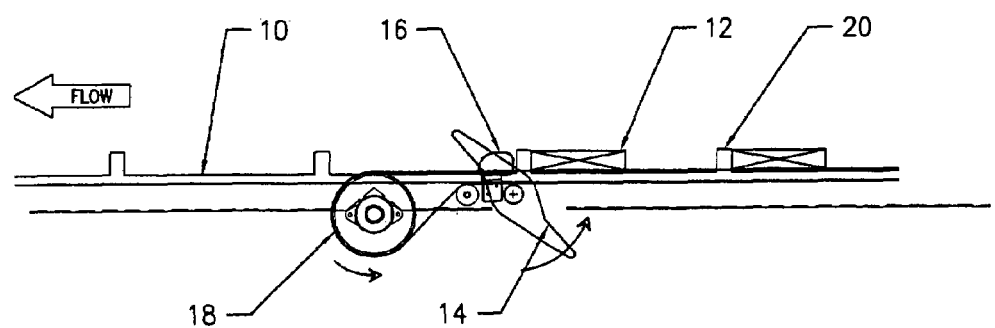
Figure 6:
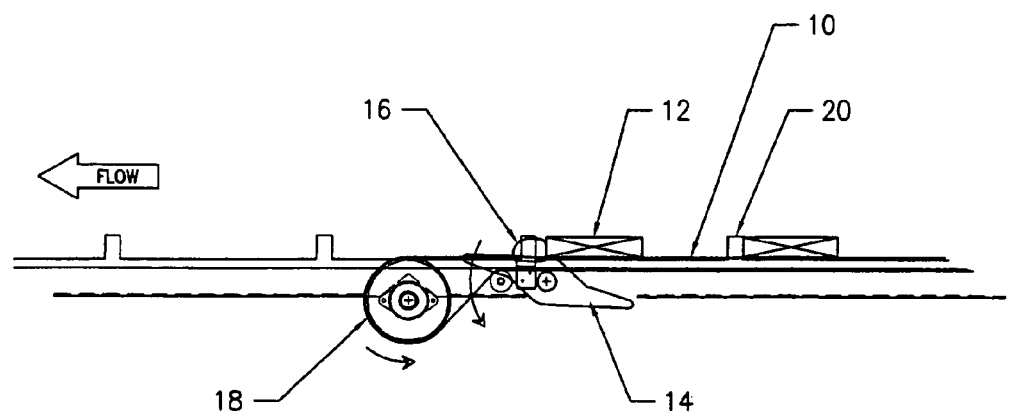
Figure 7:
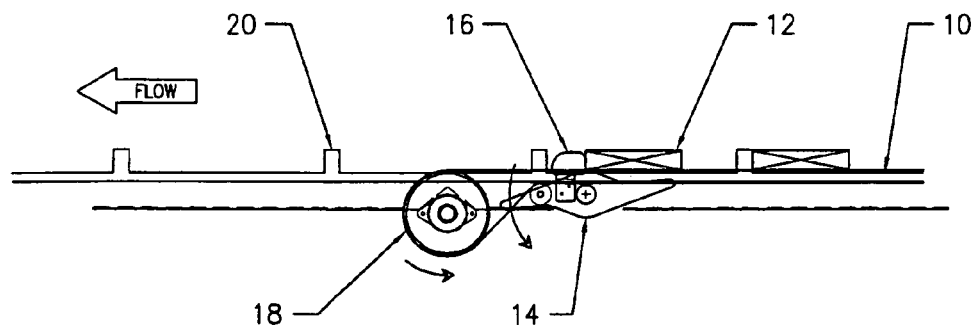
Figure 8:
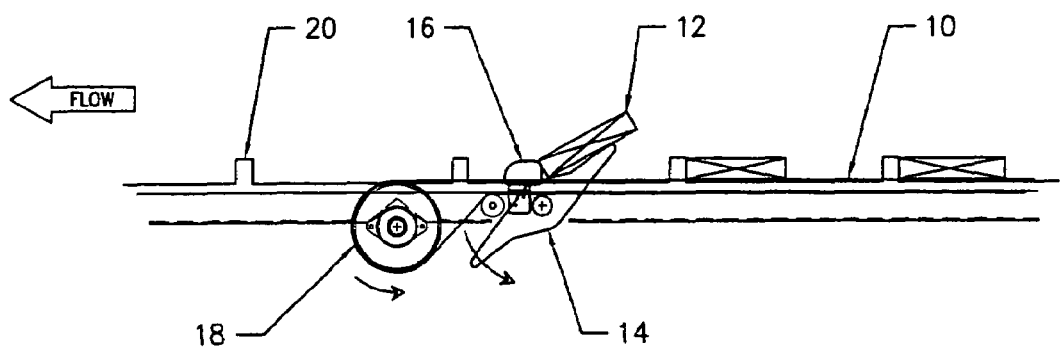
Figure 9A:
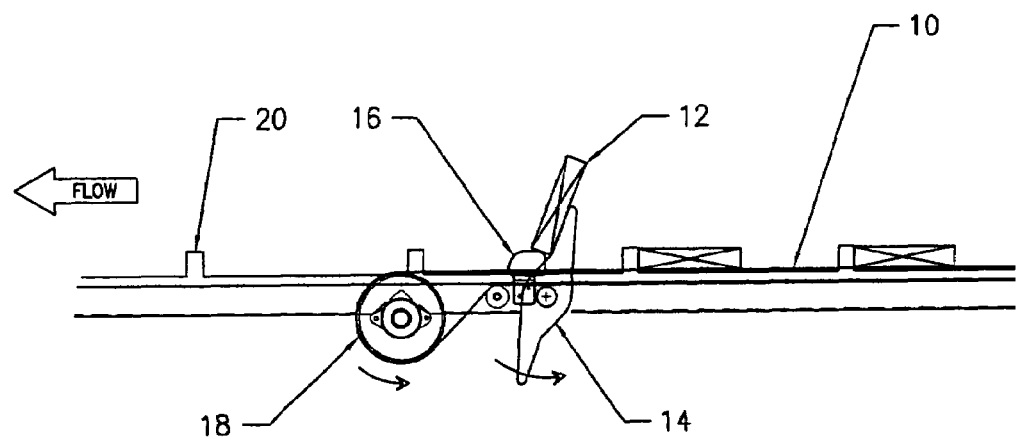
Figure 9B:
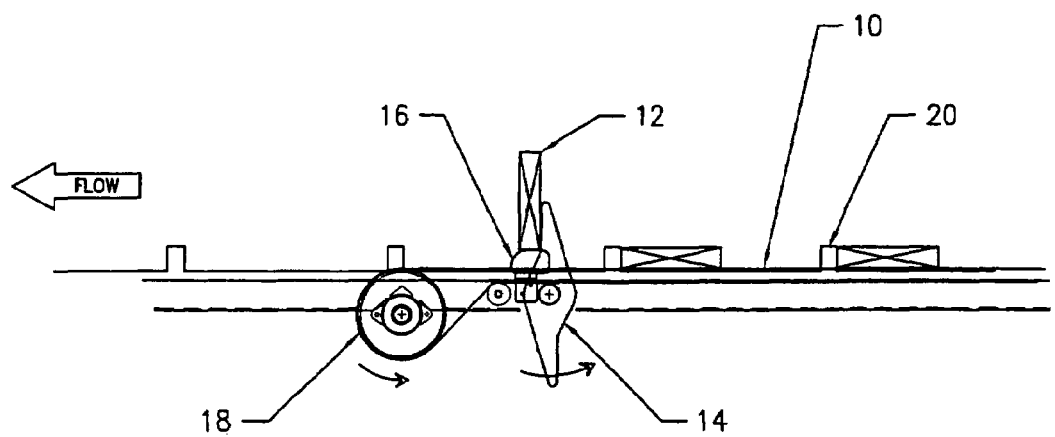
Figure 9C:
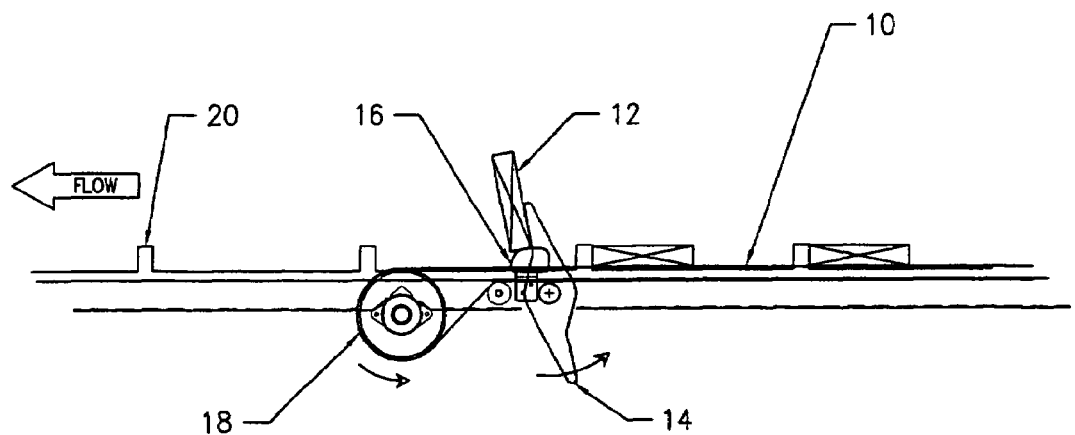
Figure 10:
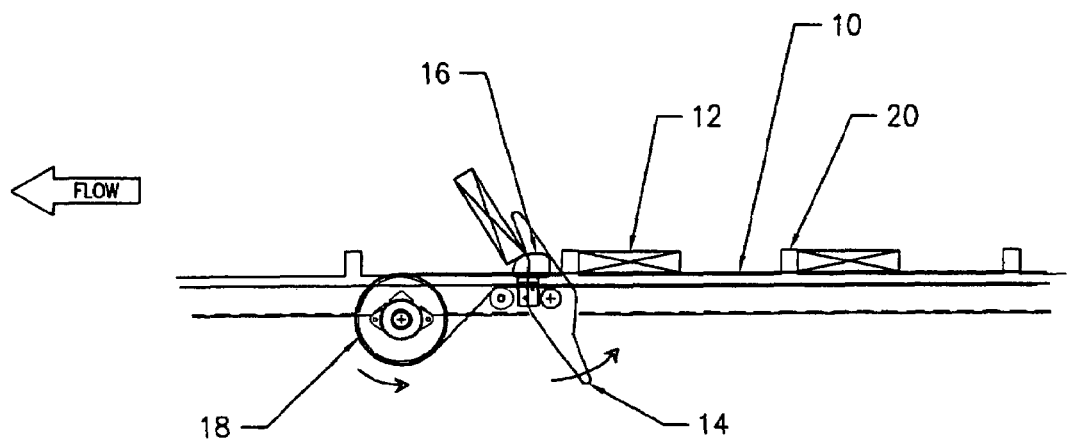
Figure 11A:
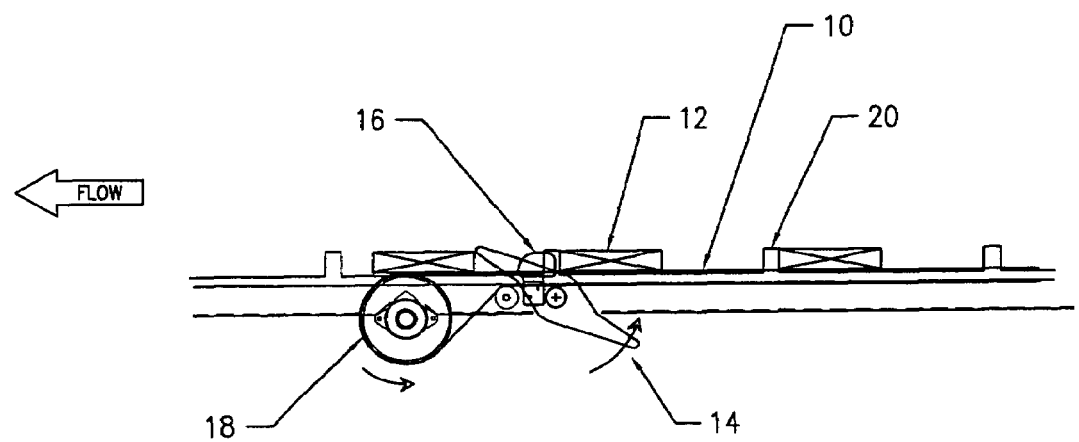
FIG. 11 (a) is a view of the board being initially sped away from the turner by the speed up belt.
Figure 11B:
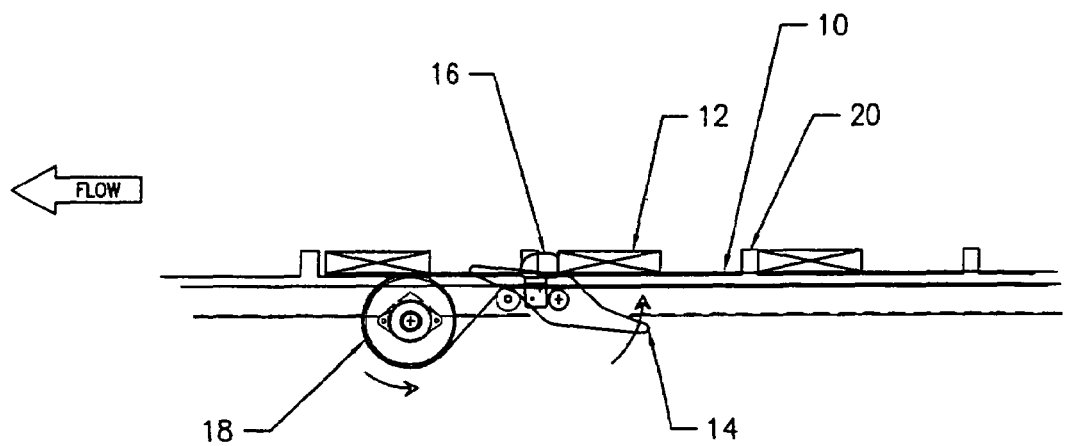
Figure 12:
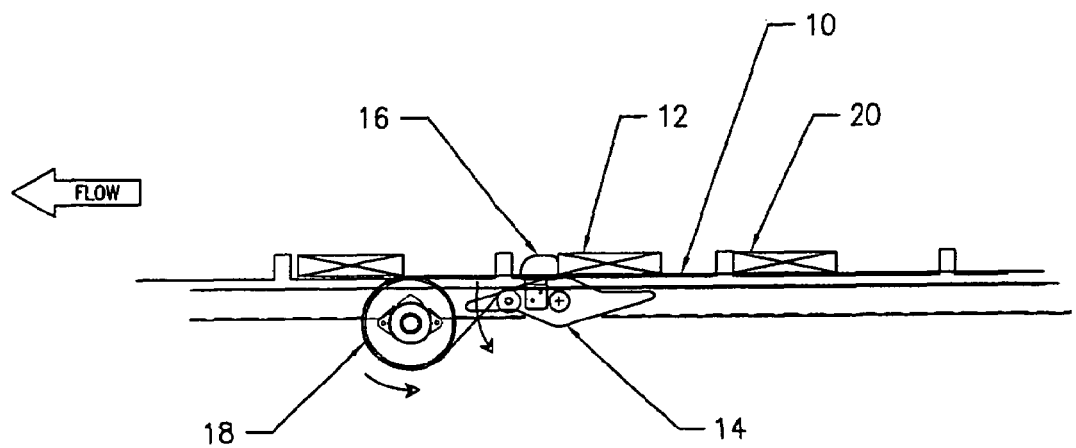
FIG. 12 is a view of the board being carried away by the conveyance system.
Figure 13:
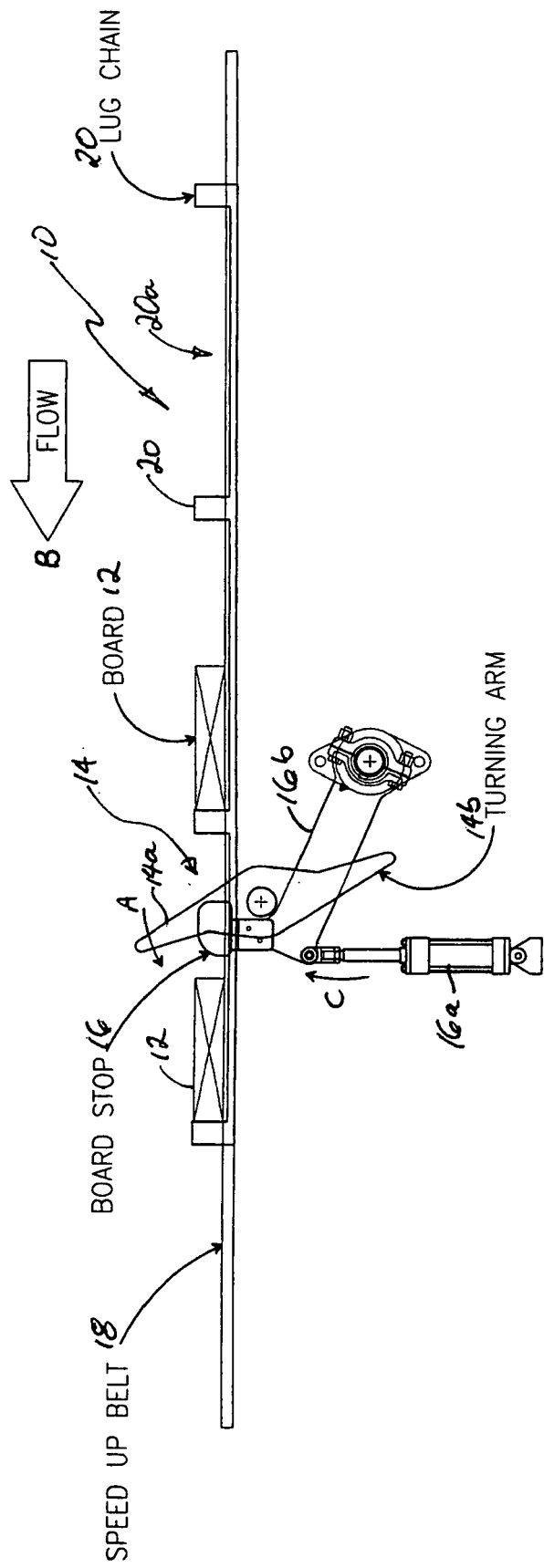
FIGS. 13 to 18 illustrate an embodiment of the present invention wherein the bumper stop may be actively actuated into and out of the board flow path, and show the sequence of a board being turned in a single lug space.
Figure 14:
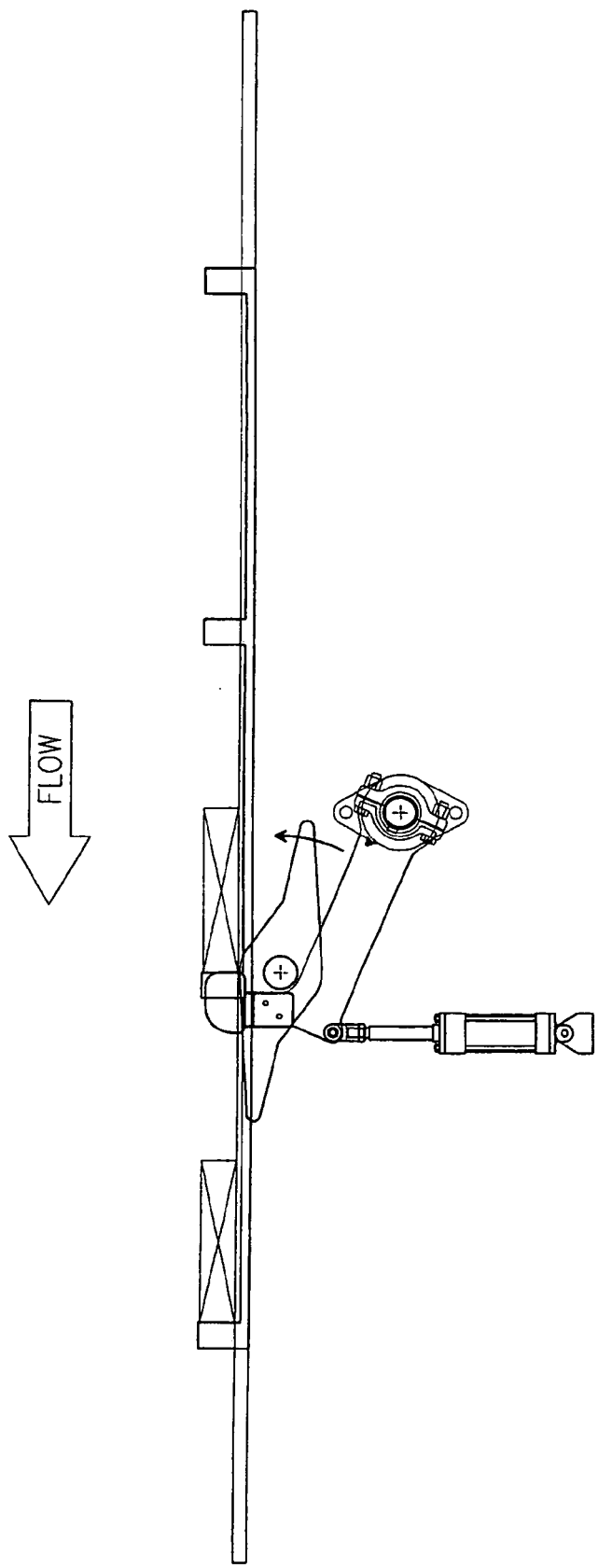
Figure 15:
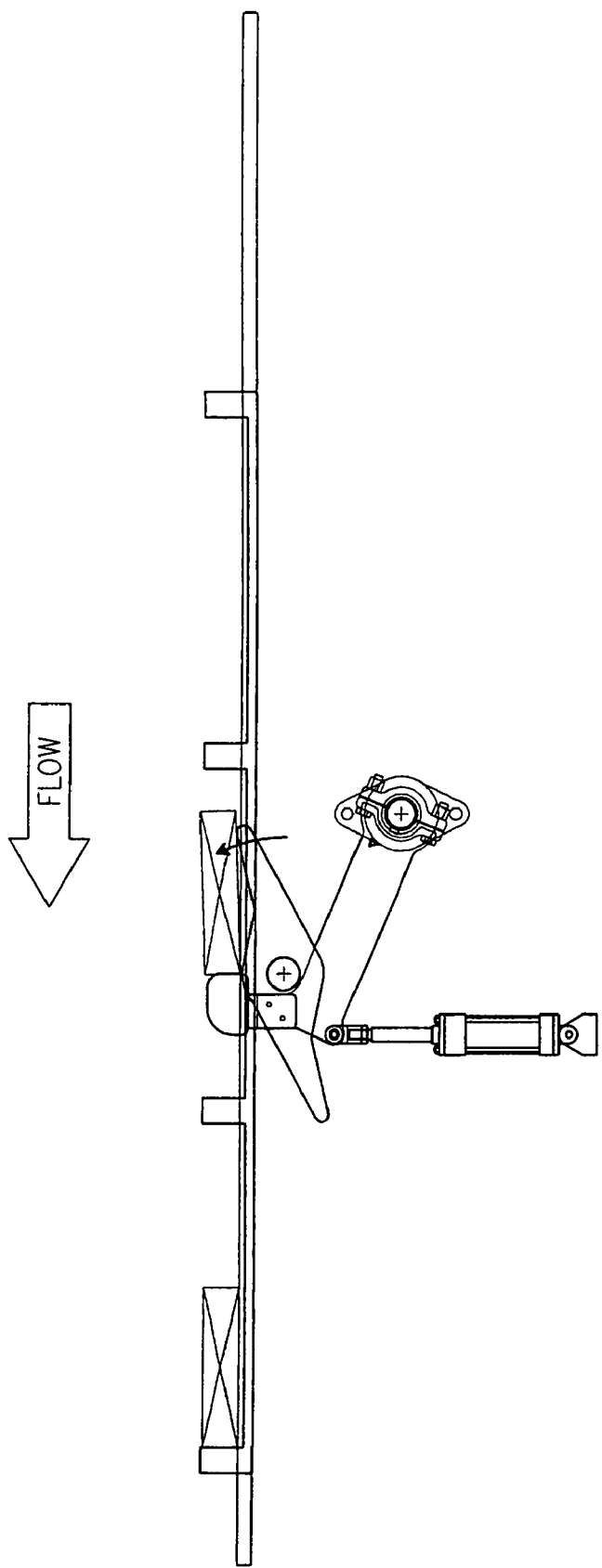
Figure 16:
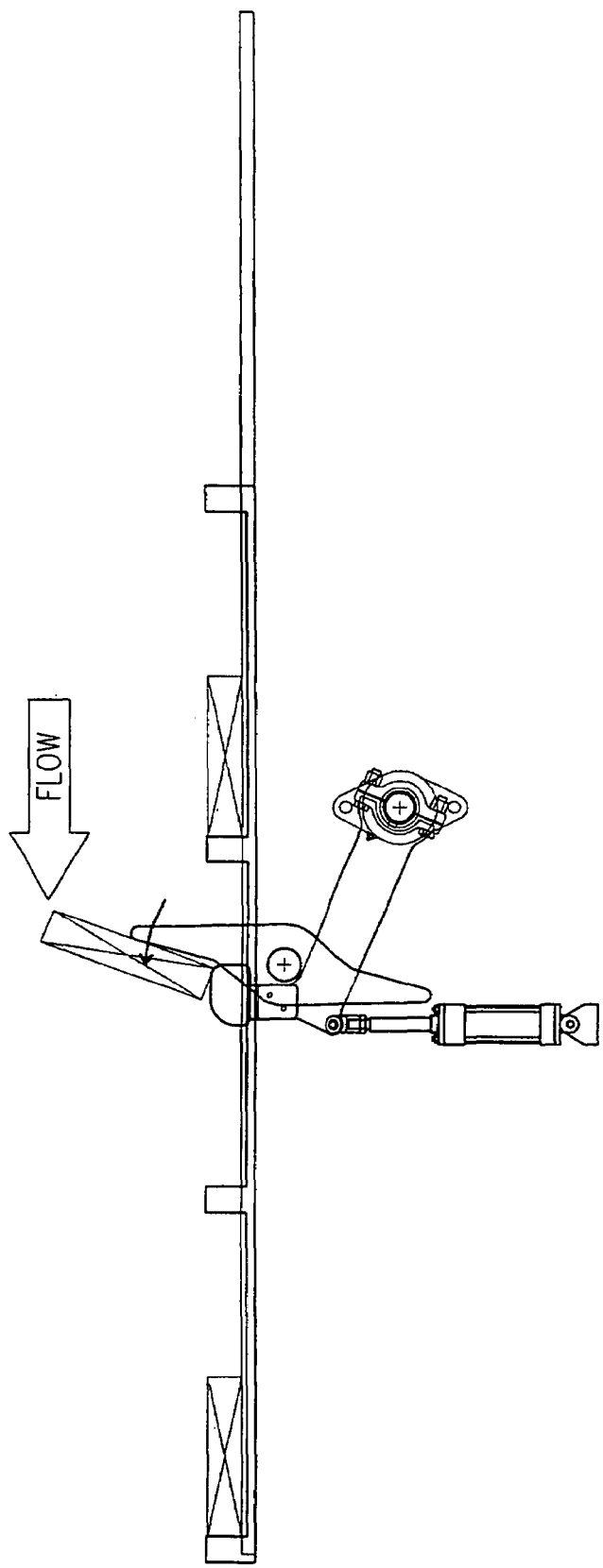
Figure 17:
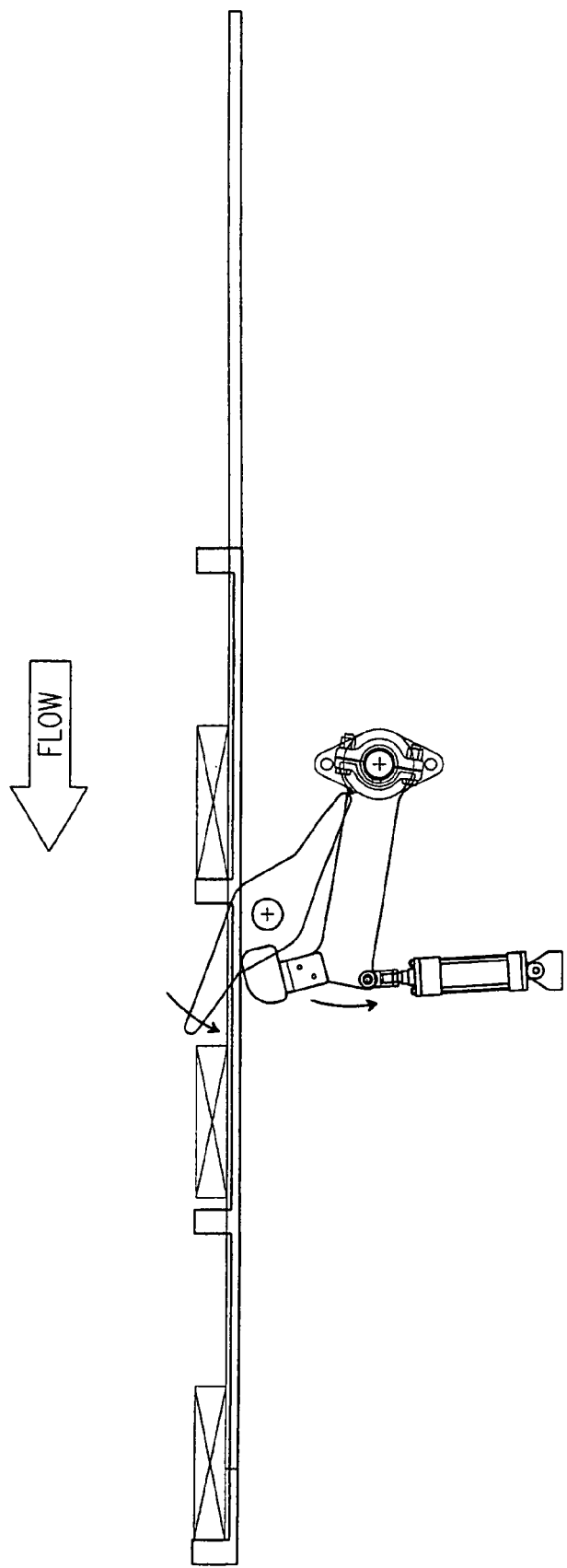
Figure 18:
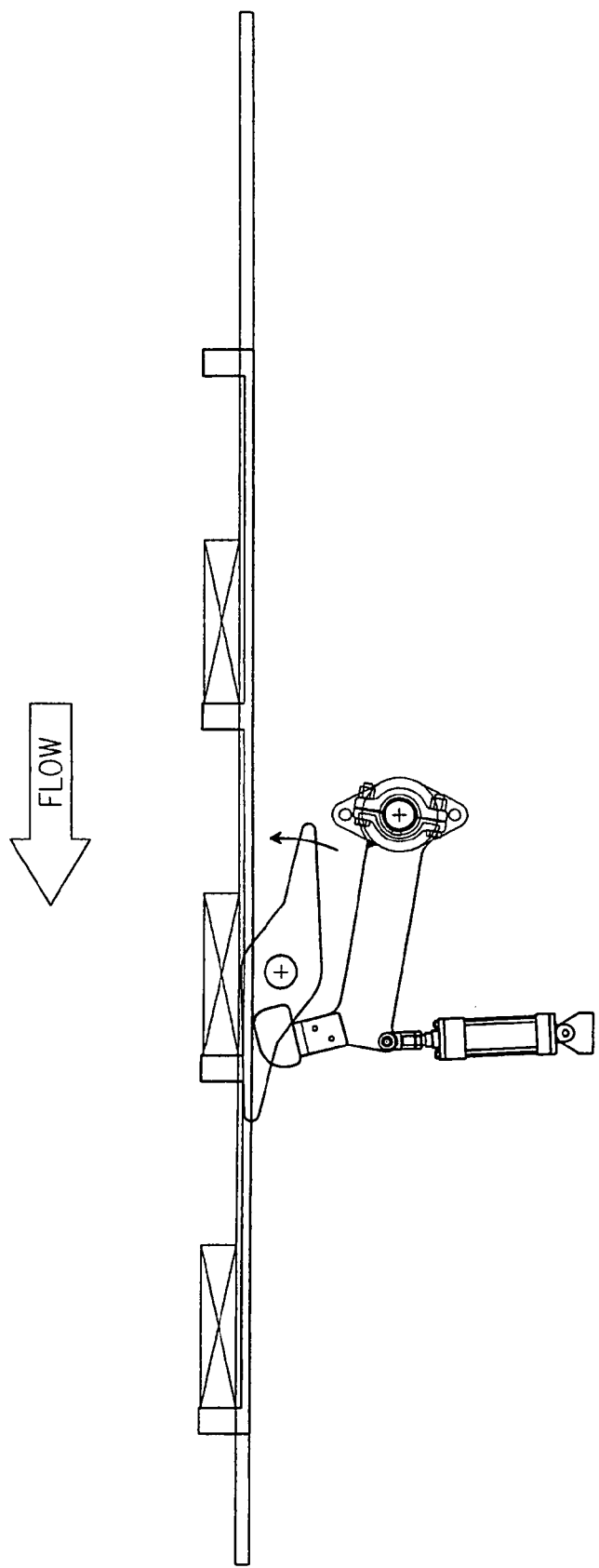

Turning now descriptively to the drawings, in which similar reference characters denote similar elements throughout the several views, the attached figures illustrate a powered rotary board turner, which comprises a conveyor 10 for transporting the board 12, a rotary turning device 14 for rotating board 12 in direction A at a rate which is constant relative to the rate of translation in direction B of the conveyor 10. A bumper stop 16 restrains board 12 and a speed up belt 18 accelerates board 12 to the front of the conveyor for example forwardly (also in direction B) in a lug spacing 20a to the front of the lug space between lugs 20.

The rotary turning device rotates at a rate which is constant relative to the conveyor. Board 12 is turned while board 12 is being transferred on the conveyor. While in the conveyor, board 12 is accelerated by the use of speed-up belts 18 or some other forward acceleration means in direction B to the front of the lug space between lugs 20 so as to engage bumper stop 16 at the front of the lug space. Board 12 is stopped by retractable bumper stops 16. Bumper stops 16 may be actuated by actuators 16a driving arm 16b upwardly so that the bumper stops extend upwardly from the top of conveyor 10. Bumper stops 16 may be fixed in a single station system. Board 12 is then picked up by rotary turning device 14 and rotated in direction A over the bumper stops and dropped into the same lug space that it originated from. Thus the board is turned one hundred eighty degrees about its longitudinal axis in the time it takes for the length of the lug space to pass by the bumper stop.

Figure 19:
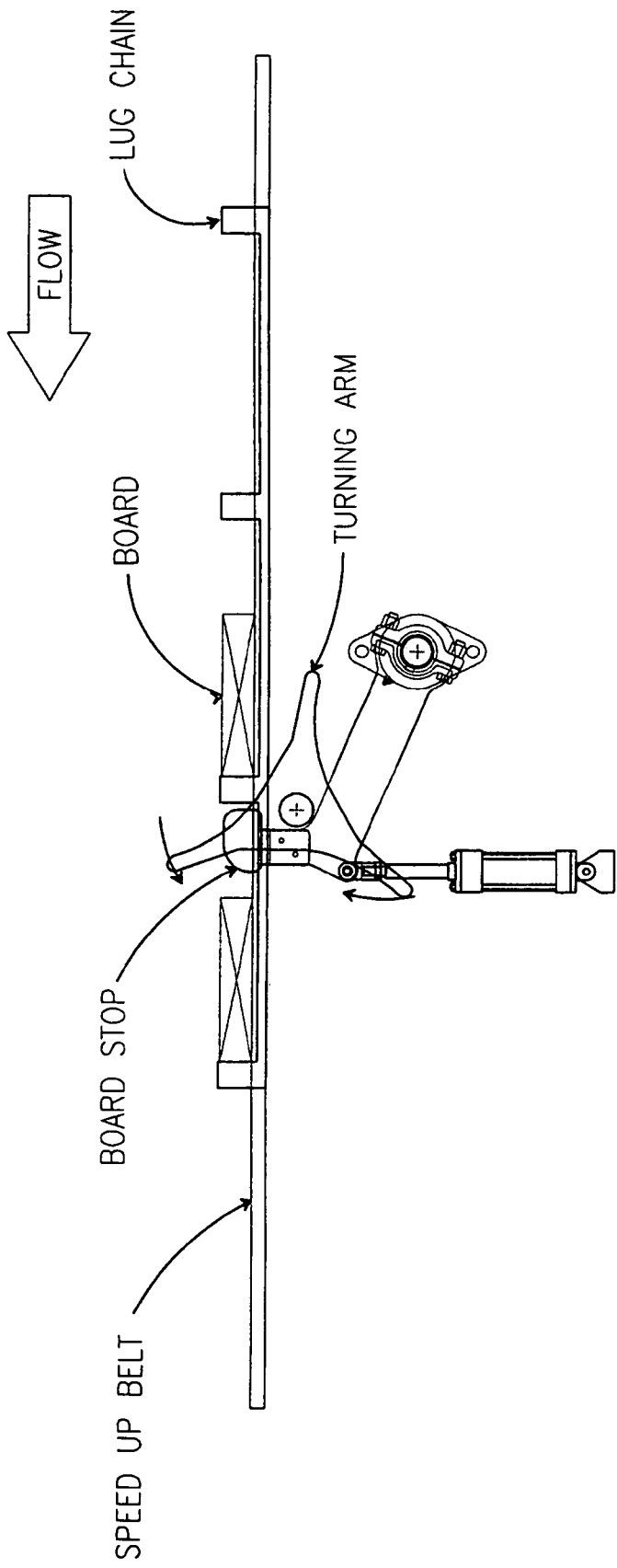
FIG. 19 is an alternative embodiment of the present invention illustrating a driven rotator arm having three equally radially spaced apart turning arms.

In one embodiment the rotary turning device has two arms 14a, 14b and rotates at the rate of ½ a revolution per conveyor or lug space or board. In other embodiments it may for example have only one arm (not shown) and rotate at 1 revolution per conveyance system or boards, or as seen in FIG. 19 have three arms and rotate at ⅓ a revolution per conveyor space or lug space or board. Thus the system is not restricted to a pre-determined number of arms. In the above example if bumper stop 16 was left up, the boards in every conveyor space, for example every lug space, would be turned.

If it was desired to have more than one board turner in a given conveyor space, for example more than one board turner per lug space, then two or more powered rotary board turners in series may be provided. If for example you have two turners and want to turn every second board you may achieve this by actuating bumper stops 16 up in direction C into the board flow path for every second board. Thus every second board will pass over the bumper stop and over the rotary turning device and will not be turned. This approach may be employed on any number of board turner stations. If for example you had a four station powered rotary board turner, only every fourth board would have to be turned at one station in the sequence of four stations. Coordinating all four stations would then turn every board. In the case where the rotary turning devices are each two-armed, the arms rotate in direction A at half a revolution per lug space (that is, the same as a single station) and are thus capable of turning the boards in all lug spaces if required, that is leaving the bumper stop up for that station. Without having to change the speed of the rotary turning devices relative to the conveyance system rate (or disconnecting the drive mechanism) you could choose to run any number of the four stations in any combination by lifting the bumper stops at the appropriate times.

The rotation of the actuation means for board turner 14 is advantageously actuated by a linkage to the conveyance system so that the device is always in time, that is, at a constant rotation rate relative to the conveyance system speed.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A rotary board turner comprising:
   a conveyor having discreet board engaging means in spaced relation therealong defining board carrying spaces therebetween for carrying, at a downstream translation velocity along a flow path, a board aligned across a downstream flow direction of said conveyor,
   an acceleration means for accelerating, relative to said conveyor and said conveyor velocity, the board in a board carrying space of said board carrying spaces of said conveyor to a downstream-most end of said board caring space,
   a bumper stop in a board engaging position in said flow path so as to engage the board in said board carrying space when at said downstream-most end and so as to inhibit motion of the board in said downstream flow direction while the board is in contact with said conveyor and while said conveyor is simultaneously in motion at said translation velocity,
   at least one driven rotator arm rotatably mounted under said conveyor for rotating to engage an underside of the board, once the board is engaged against said bumper stop, so as to rotate the board one hundred eighty degrees about its longitudinal axis, and up and over said bumper stop in said down-stream flow direction, and so as to deposit the board towards an upstream end of said board carrying space without requiring a change in or stopping of said translation velocity of said conveyor.

2. The device of claim 1 wherein said bumper stop is mounted to an actuator for selectively actuable substantially vertical translation between an elevated position corresponding to said board engaging position and a lowered position removed from said flow path.

3. The device of claim 1 wherein said conveyor is a lugged conveyor and said discreet board engaging means are a spaced array of lugs mounted on said conveyor.

4. The device of claim 1 wherein said acceleration means is a speed-up belt.

5. The device of claim 1 wherein said acceleration means has an upstream end and an opposite downstream end, and wherein said bumper stop is adjacent said downstream end of said acceleration means.

6. The device of claim 1 wherein said at least one driven rotator arm includes a pair of oppositely disposed rigid arms rigidly cantilevered from a driven shaft.

7. The device of claim 6 wherein said driven shaft is driven at a rotational speed which is constant relative to said translation velocity of said conveyor.

8. The device of claim 7 wherein said driven shaft and said conveyor are mechanically linked to one another by a driving linkage means so as to provide said rotational speed which is constant relative to said translation velocity of said conveyor.

9. The device of claim 1 wherein said at least one driven rotator arm is mounted cantilevered from a driven shaft and wherein said driven shaft is driven at a rotational speed which is constant relative to said translation velocity of said conveyor.

10. The device of claim 9 wherein said driven shaft and said conveyor are mechanically linked to one another by driving linkage means so as to provide said constant relative speeds between said shaft and said conveyor.

11. The device of claim 1 wherein said at least one driven rotator arm is rotatably mounted on driving means mounted beneath an upper surface of said conveyor and adjacent said bumper stop.

12. The device of claim 2 wherein said conveyor is a lugged conveyor and said discreet board engaging means are a spaced array of lugs mounted on said conveyor.

13. The device of claim 12 wherein said acceleration means is a speed-up belt.

14. The device of claim 13 wherein said speed-up belt has an upstream end and an opposite downstream end, and wherein said bumper stop is adjacent said downstream end of said speed-up belt.

15. The device of claim 14 wherein said at least one driven rotator arm includes a pair of oppositely disposed rigid arms rigidly cantilevered from a driven shaft.

16. The device of claim 14 wherein said driven shaft is driven at a rotational speed which is constant relative to said translation velocity of said conveyor.

17. The device of claim 15 wherein said driven shaft and said conveyor are mechanically linked to one another by a driving linkage means so as to provide said rotational speed which is constant relative to said translation velocity of said conveyor.

18. The device of claim 2 wherein said at least one driven rotator arm is mounted cantilevered from a driven shaft and wherein said driven shaft is driven at a rotational speed which is constant relative to said translation velocity of said conveyor.

19. The device of claim 18 wherein said driven shaft and said conveyor are mechanically linked to one another by driving linkage means so as to provide said constant relative speeds between said shaft and said conveyor.

20. The device of claim 2 wherein said at least one driven rotator arm is rotatably mounted on driving means mounted beneath an upper surface of said conveyor and adjacent said bumper stop.

21. The device of claim 2 wherein said bumper stop is actuable independently of rotation of said at least one driven rotator arm.

* * * * *